(12) United States Patent (10) Patent No.: US 8,473,249 B2
Handley et al. (45) Date of Patent: Jun. 25, 2013

(54) SYSTEM AND METHOD TO DETECT PRINTING DEVICES WITH HIGH INCIDENT RATES

(75) Inventors: John C. Handley, Fairport, NY (US); Jie Ning, Ann Arbor, MI (US); Jeremy Lee Reitz, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 183 days.

(21) Appl. No.: 13/025,233

(22) Filed: Feb. 11, 2011

(65) Prior Publication Data

US 2012/0209565 A1    Aug. 16, 2012

(51) Int. Cl.
*G06F 17/18* (2006.01)
*G06F 17/10* (2006.01)
*G06Q 10/00* (2012.01)

(52) U.S. Cl.
USPC .............................. 702/179; 705/7.41; 703/2

(58) Field of Classification Search
USPC ............... 702/179, 81, 84–86, 127, 180–185, 702/187–189; 703/2, 4; 705/7.38, 7.41; 714/1, 714/25, 37, 46, 47.1–47.3, 48, 57
See application file for complete search history.

(56) References Cited

PUBLICATIONS

Handley et al., Extreme Volume Detection for Managed Print Services, 2010 IEEE, pp. 617-622.*

* cited by examiner

*Primary Examiner* — Toan Le
(74) *Attorney, Agent, or Firm* — Fox Rothschild LLP (57) ABSTRACT

Method and systems of identifying a printing device having an exceptional incident rate among a plurality of printing devices are disclosed. For each of a plurality of printing devices, a processor receiving a printing device model, a print volume, and an incident count that includes a number of incidents occurring within a particular time frame. The processor determines a generalized linear regression model of the incident counts for each printing device model and also determines a predicted incident count for each printing device model using the generalized regression model. The processor determines a residual value for each printing device between the incident count for the printing device and the predicted incident count for the printing device model associated with the printing device. The processor identifies one or more printing devices having a residual value exceeding a threshold value.

20 Claims, 7 Drawing Sheets

SYSTEM AND METHOD TO DETECT PRINTING DEVICES WITH HIGH INCIDENT RATES

BACKGROUND

A managed print service is used to manage the operation of printing devices, such as printers, scanners, copiers, multifunction devices and/or the like, in a unified fashion. In addition, a managed print service permits an enterprise to outsource management of its hardcopy devices to an external vendor, which allows the enterprise to focus on its core business.

Managed print services often provide supplies and repairs to an enterprise customer on a negotiated price per impression basis. Each device in a managed print service account may be equipped with a device manager that polls the device and collects information regarding the number and kind of prints the device has performed and other aspects of its current state and/or operation. A data warehouse typically contains information about an account and its devices. Account information includes a historical record of incidents that occur for each device. An incident may include a hardware or software issue that is generated by a device manager. The incident may be reported to, for example, a technician associated with a call center for the managed print service who resolves the related issue.

Some printing devices in a managed print service account require excessive attention because they generate an abnormally high number of incidents or requests for maintenance. Account managers for managed print service accounts are interested in identifying printing devices that negatively effect the revenue generated from an account and/or the price per impression that can be offered for the account. In some cases, these printing devices may have special problems that cause the printing devices to raise incidents. Identifying these printing devices and replacing them with better performing printing devices can lower the cost of maintaining a managed print service account.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system for identifying a printing device having an exceptional incident rate among a plurality of printing devices may include a processor and a processor-readable storage medium in communication with the processor. The processor-readable storage medium contains one or more programming instructions that, when executed, cause the processor to receive, for each of a plurality of printing devices, a printing device model, a print volume, and an incident count associated with the printing device that includes a number of incidents occurring within a particular time frame, determine a generalized linear regression model of the incident counts for each printing device model, determine a predicted incident count using the generalized linear regression model for each printing device model, determine a residual value, for each printing device, between the incident count for the printing device and the predicted incident count for the printing device model associated with the printing device, and identify one or more printing devices having a residual value exceeding a threshold value.

In an embodiment, a system for identifying a printing device having an exceptional incident rate among a plurality of printing devices may include a processor and a processor-readable storage medium in communication with the processor. The processor-readable storage medium contains one or more programming instructions that, when executed, cause the processor to receive, for each of a plurality of printing devices, a printing device model for the printing device, a print volume for the printing device, an amount of time between the first and last incident for the printing device, and an incident count associated with the printing device that includes a number of incidents occurring within a particular the amount of time, determine a generalized linear regression model of the incident counts for each printing device model, determine a predicted incident count based on the generalized linear regression model for each printing device model, determine, for each printing device, a residual value between the incident count for the printing device and the predicted incident count for the printing device model associated with the printing device, and identify one or more printing devices having a residual value exceeding a threshold value.

In an embodiment, a method of identifying a printing device having an exceptional incident rate among a plurality of printing devices may include, for each of a plurality of printing devices, receiving, by a processor, a printing device model, a print volume, and an incident count associated with the printing device that includes a number of incidents occurring within a particular time frame, determining, by the processor, a generalized linear regression model of the incident counts for each printing device model, determining, by the processor for each printing device model, a predicted incident count using the generalized linear regression model, determining, by the processor for each printing device, a residual value between the incident count for the printing device and the predicted incident count for the printing device model associated with the printing device, and identifying, by the processor, one or more printing devices having a residual value exceeding a threshold value.

In an embodiment, a method of identifying a printing device having an exceptional incident rate among a plurality of printing devices may include, for each of a plurality of printing devices, receiving, by a processor, a printing device model for the printing device, a print volume for the printing device, amount of time between the first and last incident for the printing device, and an incident count associated with the printing device that includes a number of incidents occurring within a particular the amount of time, determining, by the processor, a generalized linear regression model of the incident counts for each printing device model, determining, by the processor for each printing device model, a predicted incident count based on the generalized linear regression model, determining, by the processor for each printing device, a residual value between the incident count for the printing device and the predicted incident count for the printing device model associated with the printing device, and identifying, by the processor, one or more printing devices having a residual value exceeding a threshold value.

DETAILED DESCRIPTION

The following terms shall have, for the purposes of this application, the respective meanings set forth below.

A "printing device" refers to a device capable of performing one or more print-related functions. For example, a printing device may include a printer, a scanner, a copy machine, a multifunction device or other similar equipment. A "multifunction device" is a device that is capable of performing two or more distinct print-related functions. For example, a multifunction device may have print and scan capabilities.

As used herein, the term "incident" refers to an event that occurs on a device. For a printing device, an incident may include, for example and without limitation, a paper jam, a device malfunction, a broken part, a software error or the like.

As used herein, the term "incident count" refers to a number of incidents. An incident count may be determined, for example, based on the number of incidents occurring within a given time frame or over an amount of time that a device has been installed in a managed print service account.

As used herein, the term "regression model" refers to a mathematical technique used to model and analyze several variables. A regression model includes one or more unknown parameters denoted as $\beta$, which may be a scalar or a vector; one or more independent variables X; and a dependent variable Y. A regression model, thus, takes on the following form: $Y \sim f(X, \beta)$. A "linear regression model" is a regression model in which the dependent variable, Y, is a linear combination of the parameters $\beta$. Although the dependent variable is linear with respect to $\beta$, Y need not be linear with respect to the one or more independent variables X. A "generalized linear regression model" is a linear regression model in which the dependent variable Y has the property, $g(E(Y))=\beta X$, where g is a link function, such as $g(x)=\log(x)$.

As used herein, the term "print volume" is construed broadly to include, without limitation, a number of physical pages, a number of impressions, a number of images printed on a continuous web, a number of sides on a printed package, or a number of prints in "n-up" arrangements for book binding and the like.

As used herein, the terms "divide," "ratio" and "variance" and similar mathematical terms are construed broadly to include any method or algorithm in which a single datum is derived or calculated from a plurality of input data.

The present disclosure describes methods and systems for performing statistical analysis for identifying devices, such as printing devices, that have a negative impact on the profitability or cost of a managed service, such as a managed print service. In identifying such printing devices, it is insufficient to merely examine incident rates over a time window across all printing devices regardless of the model of each printing device because each model has different capabilities and should be expected to have different incident rates as a result.

In addition, print volume can have an effect on the incident rate. In particular, a lightly or heavily used printing device can have higher incident rates than a printing device used at a typical rate. In addition, each managed print service account may have a different baseline incident rate.

An automated method and system for detecting exceptional incident rates that take into account the difference in printing device models and print volumes is disclosed herein. Data retrieved from printing devices in a managed print service account are used to fit a model to predict an expected number of incidents. If the actual number of incidents for a printing device exceeds the predicted number by a significant amount, the printing device may be flagged for attention by an account manager. A uniform decision mechanism or threshold can be used to reduce the complexity of the automated system. Two levels of analysis may be performed: (i) a "tactical" analysis that looks at the last 90 days (or other relatively short time period); and (ii) a "strategic" level that looks at the long-term historical behavior.

Figure 1:
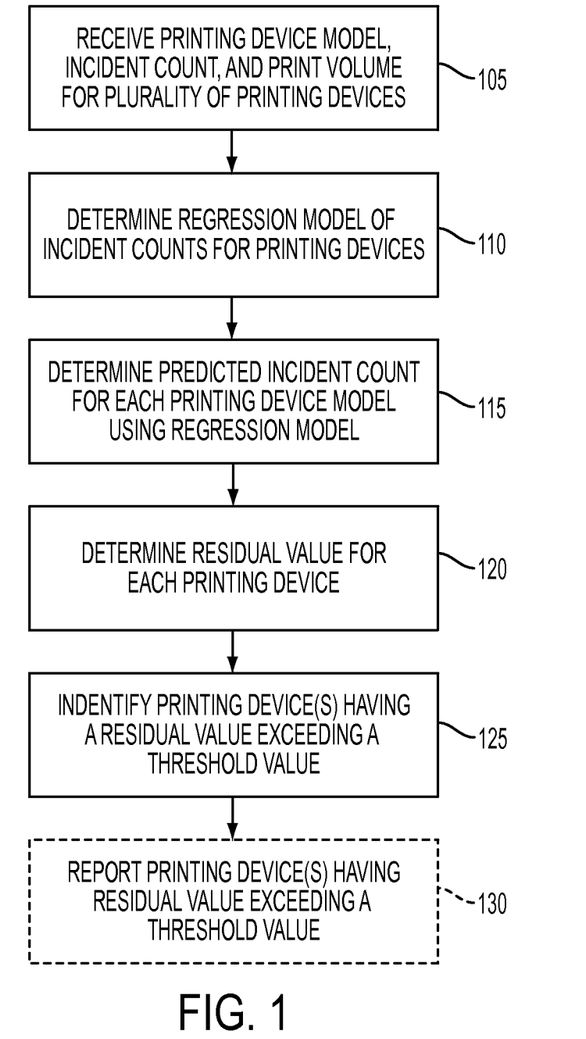
FIG. 1 depicts a flow diagram of an exemplary method for identifying printing devices having exceptional incident rates according to an embodiment.

FIG. 1 depicts a flow diagram of an exemplary method for identifying printing devices having exceptional incident rates according to an embodiment. As shown in FIG. 1, information pertaining to incidents may be received 105 from a plurality of printing devices in a managed print service account. The received information may include, for example and without limitation, printing device models and/or numbers, an incident count, and a print volume for each printing device. The incident count for a printing device may denote a number of incidents that take place with respect to the printing device within a particular time frame, such as a day, a week, a month, three months, a year or any other time frame.

A regression model of the incident counts may be determined 110 for the printing devices corresponding to each printing device model. In an embodiment, the regression model may be a generalized linear regression model. In an embodiment, the generalized linear regression model may be determined 110 by fitting a negative binomial regression model to the incident counts for the printing devices corresponding to each printing device model.

A generalized linear model is a more general formulation of a classical linear model. Generalized linear models allow response variables to have different distributions for each observed case, such as for each printing device model. In addition, the distributions for each observed case can be of differing types. Further, the means and regressors may be linked by continuous, monotonic functions, such as logarithms.

The classic linear model is described by $Y=X\beta+\epsilon$, where $\epsilon\sim N(0, \sigma^2)$. In the case of a classic linear model, $E(Y)=\mu$ is estimated as a function of X: $\mu=X\beta$, and Y has a normal distribution. In contrast, in generalized linear models, Y can have any distribution in the exponential family, including without limitation, Normal, Exponential Gamma, Inverse Gaussian, Binomial, Poisson, and Negative Binomial distributions. Negative Binomial distributions are particularly used in the modeling of count data, such as the counts of incidents.

For generalized linear models, each $Y_i$ has its own design vector $X_i'$(i.e., $$X = \begin{bmatrix} X_1' \\ \vdots \\ X_N' \end{bmatrix}$$

and each $Y_i$ has a monotonic link function g for its expectation: $\mu_i=E(Y)$ and $g(\mu_i)=X_i'\beta$, where $\beta$ is a vector of coefficients to be estimated. For count regression, the negative binomial is $Y\sim NB(y; \mu, \alpha)$. That is, Y has the probability density function $$f_Y(y; \mu, \alpha) = \binom{(y+1)/(\alpha-1)}{1/(\alpha-1)} \left(\frac{1}{1+\alpha\mu}\right)^{\frac{1}{\alpha}} \left(1 - \frac{1}{1+\alpha\mu}\right)^y,$$

where y represents the incident count over a time frame and $\alpha>0$ is a parameter governing the size of the variance of the incident count. In particular, $E(Y)=\mu$; and $variance(Y)=\mu(1+\alpha\mu)$. For negative binomial regression, a useful link function is $g(\mu)=\log(\mu)$.

Numerical procedures may then be used to determine estimates $(\hat{\alpha}, \hat{\beta})$. A common way to determine estimates is by determining a maximum likelihood. The fitted or predicted values are $\hat{\mu}=\exp(X_i'\hat{\beta})$, and the variance is estimated by $\hat{\mu}(1+\hat{\alpha}\hat{\mu})$. Residual values may then be determined.

The logarithm of the print volume (log(Volume)) for each printing device and the printing device model for each printing device may be used as regressors for the negative binomial regression model. In an embodiment, a time frame may also be used as a regressor for the regression model. However, in the currently described embodiment, all printing devices are examined within a defined time frame, which renders the time frame uninteresting as a regressor. Exemplary coefficients for a negative binomial regression model are shown in Table 1 for 7 device models.

Table 1 represents the mathematical model $E(Y)=-3.45+0.38 \log(\text{Volume})-0.37(\text{Model}\#1)-1.42(\text{Model}\#2)-0.26(\text{Model}\#3)-1.08(\text{Model}\#4)-0.84(\text{Model}\#5)-0.53(\text{Model}\#6)+0.19(\text{Model}\#7)$ where the variable "Model#1" is equal to 1 if the incident counts come from a device of Model #1 and is equal to 0, otherwise, etc. Estimated coefficients are estimates of the parameter vector $\beta$.

TABLE 1

| Coefficients for Binomial Regression Model | |
|---|---|
| | Estimated Coeff. |
| (Intercept) | −3.45 |
| log(Volume) | 0.38 |
| Model #1 | −0.37 |

TABLE 1-continued

| Coefficients for Binomial Regression Model | |
|---|---|
| | Estimated Coeff. |
| Model #2 | −1.42 |
| Model #3 | −0.26 |
| Model #4 | −1.08 |
| Model #5 | −0.84 |
| Model #6 | −0.53 |
| Model #7 | 0.19 |

In an embodiment, a regression model may be determined 110 using the information for the printing devices in a managed print service account. A separate regression model may be determined for each managed print service account because the printing device models in each account may differ. The print volume may also differ substantially for particular printing device models between accounts. As such, the regression coefficients may differ substantially between accounts as well.

For each printing device model, a predicted incident count may be determined 115 using the regression model. In an embodiment, the predicted incident count may be determined 115 based on the incident count for all printing devices of a particular printing device model within a managed print service account.

A residual value may be determined 120 for each printing device. The residual value may be determined 120 based on the incident count for the printing device and the predicted incident count for the printing device model associated with the printing device as determined 115 using the regression model. In an embodiment, the residual value may be determined 120 by determining the Pearson residual, which is determined by the following equation:

$$\varepsilon_i = \frac{y_i - \hat{\mu}_i}{\sqrt{\hat{\mu}_i(1+\hat{\alpha}\hat{\mu}_i)}}.$$

Generally, residual values are approximately normally distributed. The above equation essentially determines the difference between the incidence count for a particular printing device and the predicted incident count for a printing device model associated with the printing device. The difference is then divided by the variance for the printing device model.

One or more printing devices having a residual value that exceeds a threshold value may then be identified 125. For example, printing devices having incidence counts $y_i$ with large $\epsilon_i$ (i.e., $\Pr(Z\leq\epsilon_i)$, $Z\sim N(0,1)$, is greater than, for example, 0.975) may be identified 125 as being exceptional. In an embodiment, a threshold value may be determined for each printing device model based on, for example, a normal distribution of the residual values for the printing device model. One or more printing devices having a residual value that exceeds the threshold value for the printing device model associated with the corresponding printing device may be identified.

In an embodiment, the one or more printing devices having a residual value exceeding a threshold value may be reported 130 to a user. For example, a list of exceptional printing devices may be identified by a designator, such as a printing device number. In an alternate embodiment, printing device models for which particular printing devices have residual values exceeding a threshold value may be reported 130 to a user. In an embodiment, a report may be displayed such that the printing device having the residual value that exceeds the threshold value by the largest amount or the printing device model that includes the largest number of printing devices having residual values that exceed the corresponding threshold value is displayed first. In an embodiment, the report may be displayed to a user via a display. In an alternate embodiment, the report may be sent to the user in the form of an electronic or physical message.

Table 2 includes an exemplary list of printing devices for which the corresponding residual value exceeds a threshold value. Each listing includes the incident count and print volume for the printing device, a printing device identifier, and a printing device model corresponding to the printing device.

TABLE 2

List of Printing Devices with Exceptional Incident Rate

| Incident Count | Print Volume | Device Number | Device Model |
|---|---|---|---|
| 20 | 32221 | 337750 | Model #3 |
| 9 | 25895 | 358630 | Model #4 |
| 5 | 1300 | 244431 | Model #7 |
| 10 | 88036 | 728112 | Model #6 |
| 6 | 38642 | 619781 | Model #5 |
| 4 | 18318 | 366578 | Model #4 |
| 3 | 1506 | 727844 | Model #6 |
| 2 | 3325 | 338795 | Model #2 |
| 2 | 1556 | 358628 | Model #4 |
| 5 | 14451 | 293040 | Model #1 |
| 5 | 14524 | 295278 | Model #1 |
| 4 | 3216 | 238227 | Model #7 |
| 6 | 60322 | 733161 | Model #6 |
| 2 | 5543 | 372545 | Model #4 |
| 3 | 16455 | 031300 | Model #5 |
| 5 | 33823 | 024300 | Model #1 |

Figure 2A:
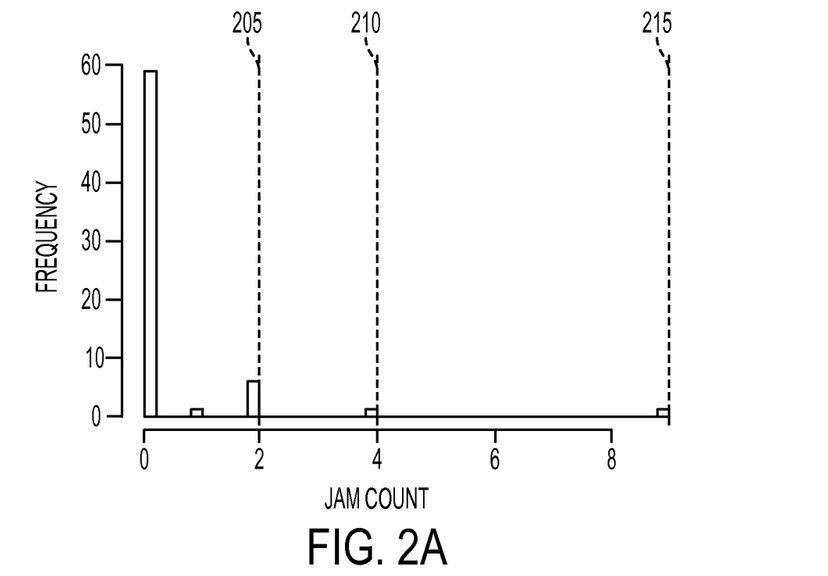
FIG. 2A depicts a histogram of the number of incidents for exemplary printing devices of the same model type according to an embodiment.
Figure 2B:
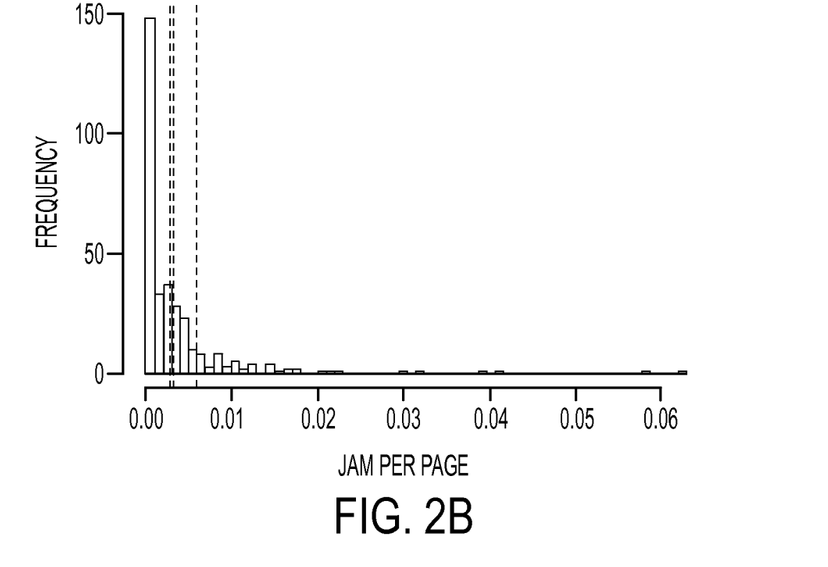
FIG. 2B depicts a histogram of the number of incidents per page for exemplary printing devices of the same model type according to an embodiment.

FIG. 2A depicts a histogram of the number of incidents for printing devices of device model #4 in a managed print service account based on the information displayed in Table 2. The vertical lines 205, 210, and 215 in FIG. 2A denote printing devices having residual values that exceed a threshold value. As shown, printing device #358630 has 9 incidents for a print volume of 25895 impressions; printing device #266578 has 4 incidents on a print volume of 18318 impressions; and printing device #372545 has 2 incidents on a print volume of 5543 impressions. FIG. 2B depicts a histogram of the number of incidents per page for all printing devices of device model #4 in a managed print service account based on the information displayed in Table 2.

Figure 3:
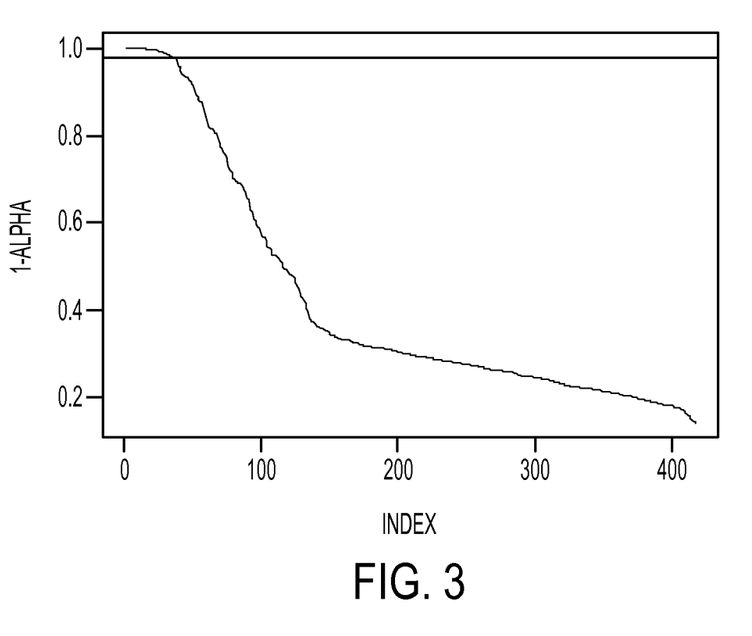
FIG. 3 depicts a graph of normalized incident rates for each printing device in an exemplary managed print service account according to an embodiment.

FIG. 3 depicts an exemplary graph of normalized incident rates for each printing device in a managed print service account according to an embodiment. As shown in FIG. 3, 38 printing devices include a residual value that is greater than 0.975 (the threshold value in this case), where $1-\alpha = \Pr(X < \text{Pearson Residual})$.

Figure 4:
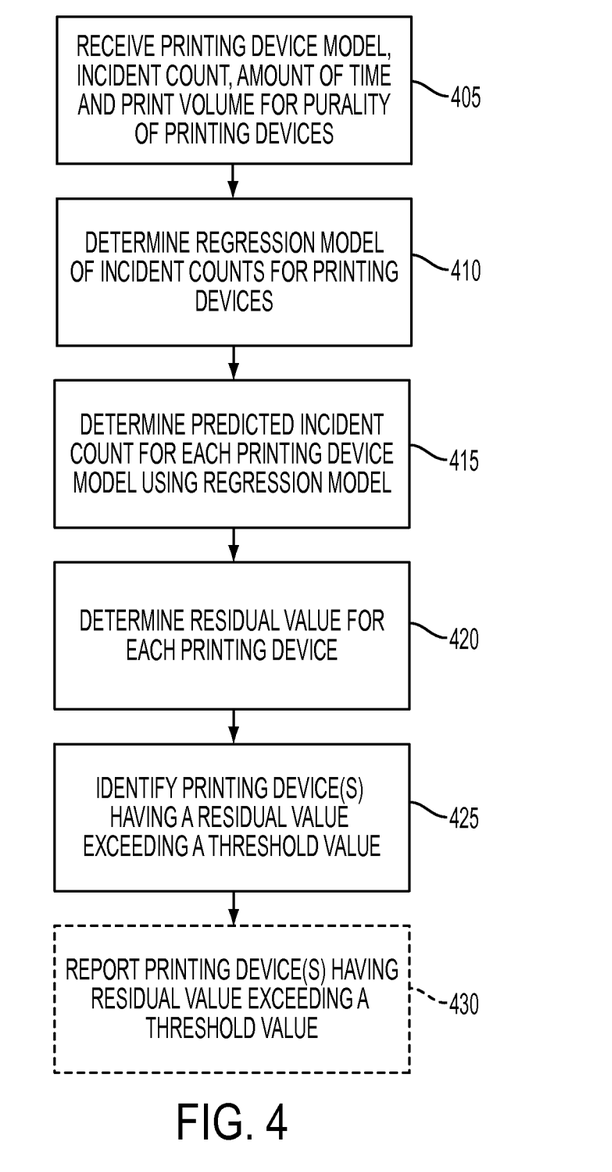
FIG. 4 depicts a flow diagram of an exemplary method for identifying printing devices having exceptional incident rates according to an embodiment.

FIG. 4 depicts a flow diagram of an exemplary method for detecting printing devices with exceptional break fix incident rates according to an embodiment. As shown in FIG. 4, information pertaining to incidents may be received 405 from a plurality of printing devices in a managed print service account. The received information may include, for example and without limitation, printing device models and/or numbers, an incident count, a print volume for each printing device and an amount of time between a first and last incident. The incident count may denote a number of incidents occurring within the amount of time.

A generalized linear regression model of the incident counts may be determined 410 for the printing devices corresponding to each printing device model. The logarithm of the print volume divided by the amount of time (i.e., log (Volume/time)) for each printing device and the printing device model for each printing device may be used as regressors for the negative binomial regression model. In an embodiment, the generalized linear regression model may be determined 410 by fitting a negative binomial regression model to the incident counts for the printing devices corresponding to each printing device model.

For each printing device model, a predicted incident count may be determined 415 using the generalized linear regression model. In an embodiment, the predicted incident count may be determined 415 based on the incident count for all printing devices of a particular printing device model within a managed print service account.

A residual value may be determined 420 for each printing device. The residual value may be determined 420 between the incident count for the printing device and the predicted incident count for the printing device model associated with the printing device as determined 415 using the regression model. In an embodiment, the residual value may be determined 420 by determining the Pearson residual (as described above). In an embodiment, the residual value for a printing device may be determined 420 by determining a difference between the incidence count for the printing device and the predicted incident count for the printing device model associated with the printing device and dividing such difference by the variance for the printing device model.

One or more printing devices having a residual value that exceeds a threshold value may then be identified 425. For example, printing devices having incidence counts $y_i$ with large $\epsilon_i$ (i.e., $\Pr(Z \leq \epsilon_i)$, $Z \sim N(0,1)$, is greater than, for example, 0.975) may be identified 425 as being exceptional. In an embodiment, a threshold value may be determined for each printing device model based on, for example, a normal distribution of the residual values for the printing device model. One or more printing devices having a residual value that exceeds the threshold value for the printing device model associated with the corresponding printing device may be identified.

In an embodiment, the one or more printing devices having a residual value exceeding a threshold value may be reported 430 to a user. For example, a list of exceptional printing devices may be identified by a designator, such as a printing device number. In an alternate embodiment, printing device models for which particular printing devices have residual values exceeding a threshold value may be reported 430 to a user. In an embodiment, a report may be displayed such that the printing device having the residual value that exceeds the threshold value by the largest amount or the printing device model that includes the largest number of printing devices having residual values that exceed the corresponding threshold value is displayed first. In an embodiment, the report may be displayed to a user via a display. In an alternate embodiment, the report may be sent to the user in the form of an electronic or physical message. In an alternate embodiment, a signal may be sent to a printing device having a residual value exceeding the threshold value to shut down the printing device until an account manager can repair or replace such printing device.

Table 3 includes an exemplary list of printing devices for which the corresponding residual value exceeds a threshold value. Each listing includes the incident count and print volume for the printing device, an amount of time between a first and last incident for the printing device (or if only a single incident occurred, the amount of time between the incident and the present time), an amount of time that the printing device has been in service (i.e., print age), a printing device identifier, and a printing device model corresponding to the printing device.

TABLE 3

List of Printing Devices with Exceptional Incident Rate

| Incident Count | Print Volume | Time | Print Age | Device Number | Device Model |
|---|---|---|---|---|---|
| 6 | 1063 | 175 | 194 | 239491 | Model #7 |
| 4 | 51636 | 394 | 410 | 727844 | Model #6 |
| 9 | 78979 | 315 | 435 | 358630 | Model #4 |
| 2 | 4846 | 35 | 49 | 343093 | Model #2 |
| 7 | 80478 | 301 | 340 | 326371 | Model #2 |
| 2 | 356 | 7 | 67 | 372545 | Model #4 |
| 1 | 35 | 7 | 35 | 000905 | Model #2 |
| 23 | 379967 | 431 | 433 | 728112 | Model #6 |
| 6 | 147404 | 131 | 160 | 037920 | Model #5 |
| 4 | 34591 | 224 | 249 | 366578 | Model #4 |
| 5 | 13875 | 112 | 146 | 242887 | Model #7 |
| 7 | 70434 | 420 | 437 | 619781 | Model #5 |
| 8 | 324330 | 140 | 145 | 065210 | Model #6 |
| 2 | 26523 | 126 | 143 | 366449 | Model #4 |
| 4 | 104618 | 273 | 358 | 325518 | Model #2 |
| 3 | 38144 | 168 | 171 | 034292 | Model #5 |
| 2 | 5418 | 140 | 174 | 036882 | Model #5 |
| 6 | 177505 | 413 | 437 | 619836 | Model #5 |

Figure 5A:
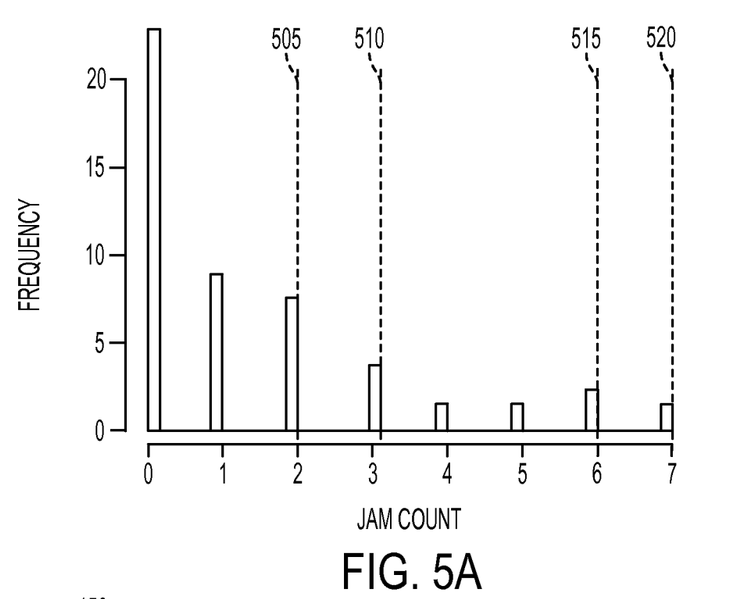
FIG. 5A depicts a histogram of the number of incidents for exemplary printing devices of the same model type according to an embodiment.
Figure 5B:
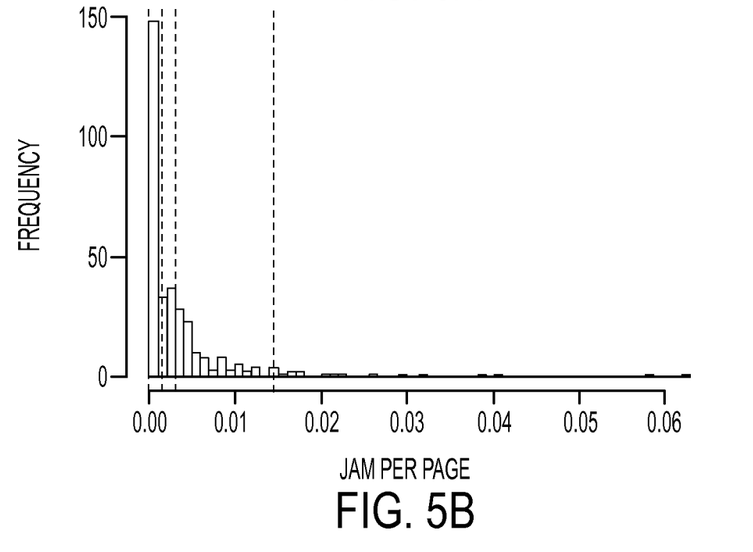
FIG. 5B depicts a histogram of the number of incidents per page for exemplary printing devices of the same model type according to an embodiment.

FIG. 5A depicts a histogram of the number of incidents for printing devices of device model #5 in a second managed print service account based on the information displayed in Table 3. The vertical lines 505, 510, 515 and 520 in FIG. 5A denote printing devices having a residual value that exceeds a threshold value. As shown, printing device #037920 has 6 incidents for a print volume of 147404 impressions with 131 days between the first and last incidents; printing device #619781 has 7 incidents on a print volume of 70434 impressions with 420 days between the first and last incidents; printing device #036882 has 2 incidents on a print volume of 5418 impressions with 140 days between the first and last incidents; and printing device #619836 has 6 incidents on a print volume of 177505 impressions with 413 days between the first and last incidents. FIG. 5B depicts a histogram of the number of incidents per page for all printing devices of device model #5 in the second managed print service account based on the information displayed in Table 3.

Figure 6:
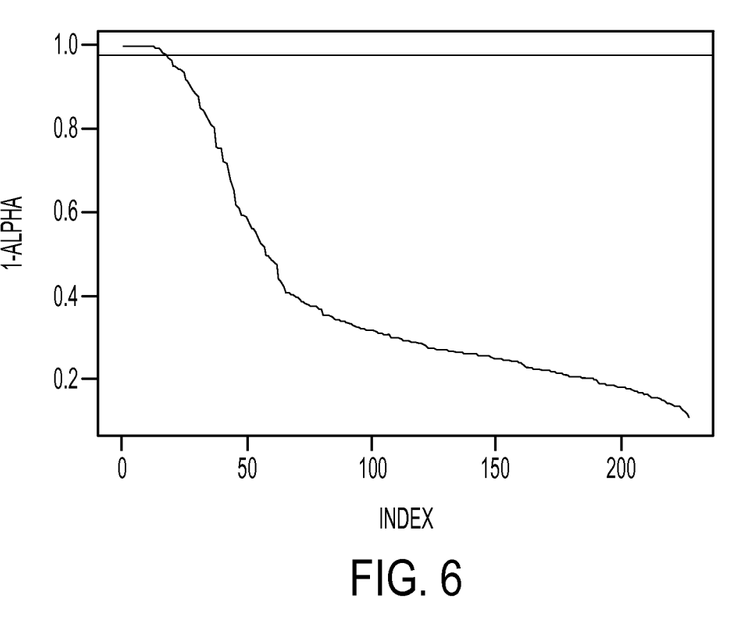
FIG. 6 depicts a graph of normalized incident rates for each printing device in an exemplary managed print service account according to an embodiment.

FIG. 6 depicts an exemplary graph of normalized incident rates for each printing device in the second managed print service account according to an embodiment. As shown in FIG. 6, 18 printing devices include a residual value that is greater than 0.975 (the threshold value in this case), where $1-\alpha = Pr(X < Pearson\ Residual)$.

Figure 7:
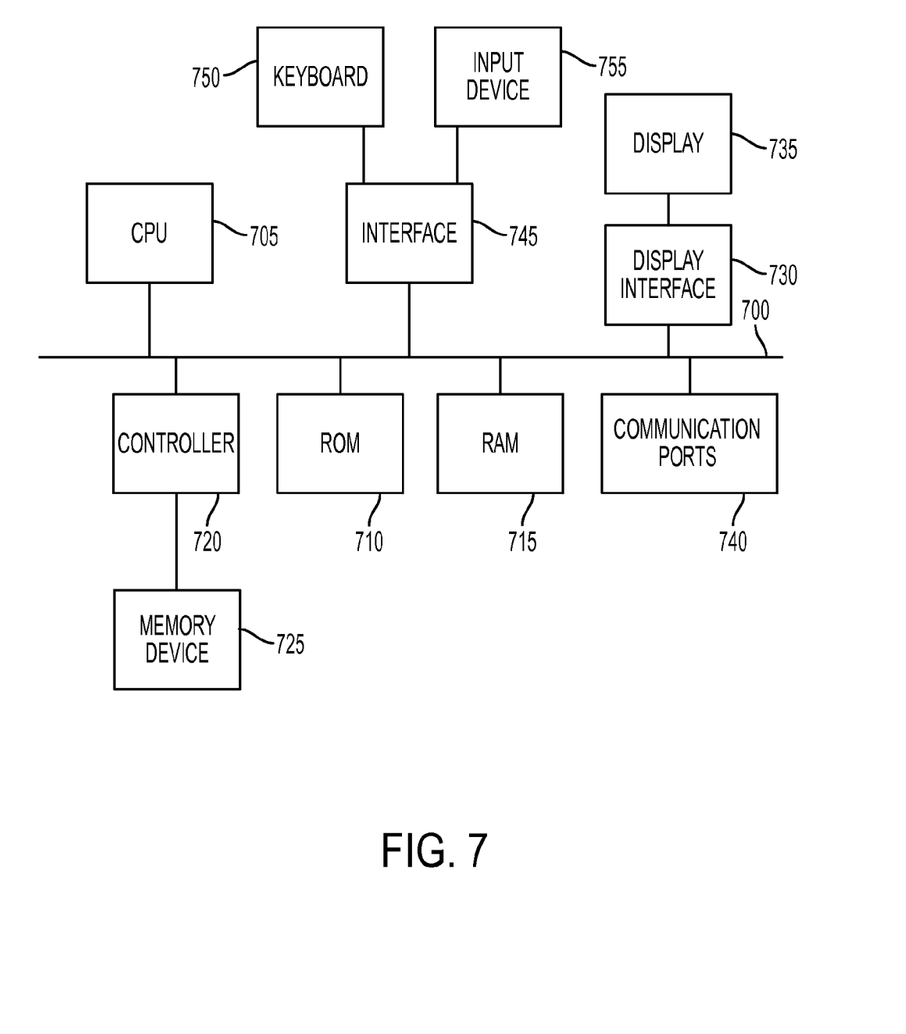
FIG. 7 depicts a block diagram of exemplary internal hardware that may be used to contain or implement program instructions according to an embodiment.

FIG. 7 depicts a block diagram of exemplary internal hardware that may be used to contain or implement program instructions, such as the process steps discussed above in reference to FIGS. 1 and 4, according to embodiments. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an exemplary processing device, computing device or processor as such terms are used within this disclosure. Read only memory (ROM) 710 and random access memory (RAM) 715 constitute exemplary memory devices or processor-readable storage media.

A controller 720 interfaces with one or more optional memory devices 725 to the system bus 700. These one or more memory devices 725 or processor-readable storage media may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 730 may permit information from the bus 700 to be displayed on the display 735 in audio, visual, graphic or alphanumeric format. Communication with external devices, such as a printing device, may occur using various communication ports 740. An exemplary communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for identifying a printing device having an exceptional incident rate among a plurality of printing devices, the system comprising:
    a processor; and
    a processor-readable storage medium in communication with the processor,
    wherein the processor-readable storage medium contains one or more programming instructions that, when executed, cause the processor to:
    receive, for each of a plurality of printing devices, a printing device model, a print volume, and an incident count associated with the printing device, wherein the incident count comprises a number of incidents occurring within a particular time frame, and wherein at least one of the incidents comprises one of a paper jam, a device malfunction, and a software error,
    determine a generalized linear regression model of the incident counts for each printing device model,
    for each printing device model, determine a predicted incident count using the generalized linear regression model,
    for each printing device, determine a residual value between the incident count for the printing device and the predicted incident count for the printing device model associated with the printing device, and
    identify one or more printing devices having a residual value exceeding a threshold value.

2. The system of claim 1 wherein the one or more programming instructions that, when executed, cause the processor to determine a generalized linear regression model comprise one or more programming instructions that, when executed, cause the processor to fit a negative binomial regression model using the logarithm of the print volume and the printing device model as regressors for the negative binomial regression model.

3. The system of claim 1 wherein the one or more programming instructions, when executed, further cause the processor to report the one or more printing devices having a residual value exceeding a threshold value to a user.

4. The system of claim 1 wherein the one or more programming instructions that, when executed, cause the processor to, for each printing device, determine a residual value comprise one or more programming instructions that, when executed, cause the processor to:
   for each printing device model, determine a variance based on the incident counts for the printing devices of the printing device model and the predicted incident count for the printing device model; and
   for each printing device:
      determine a difference between the incident count for the printing device and the predicted incident count for the printing device model associated with the printing device, and
      divide the difference for the printing device by the variance for the printing device model associated with the printing device to determine the residual value for the printing device.

5. The system of claim 1 wherein the one or more programming instructions that, when executed, cause the processor to identify one or more printing devices having a residual value exceeding a threshold value comprise one or more programming instructions that, when executed, cause the processor to:
   for each printing device model, determine a threshold value based on a normal distribution of the residual values for the printing device model; and
   identify one or more printing devices having a residual value that exceeds the threshold value for the printing device model associated with the corresponding printing device.

6. A system for identifying a printing device having an exceptional incident rate among a plurality of printing devices, the system comprising:
   a processor; and
   a processor-readable storage medium in communication with the processor,
   wherein the processor-readable storage medium contains one or more programming instructions that, when executed, cause the processor to:
   receive, for each of a plurality of printing devices, a printing device model for the printing device, a print volume for the printing device, an incident count associated with the printing device, and an amount of time between the first and last incident for the printing device, wherein the incident count comprises a number of incidents occurring within the amount of time, and wherein at least one of the incidents comprises one of a paper jam, a device malfunction, and a software error,
   determine a generalized linear regression model of the incident counts for each printing device model,
   for each printing device model, determine a predicted incident count based on the generalized linear regression model,
   determine, for each printing device, a residual value between the incident count for the printing device and the predicted incident count for the printing device model associated with the printing device, and
   identify one or more printing devices having a residual value exceeding a threshold value.

7. The system of claim 6 wherein the one or more programming instructions that, when executed, cause the processor to determine a generalized linear regression model comprise one or more programming instructions that, when executed, cause the processor to fit a negative binomial regression model using the logarithm of the ratio between the print volume and the amount of time for the printing device and the printing device model as regressors for the negative binomial regression model.

8. The system of claim 6 wherein the one or more programming instructions, when executed, further cause the processor to report the one or more printing devices having a residual value exceeding a threshold value to a user.

9. The system of claim 6 wherein the one or more programming instructions that, when executed, cause the processor to, for each printing device, determine a residual value comprise one or more programming instructions that, when executed, cause the processor to:
   for each printing device model, determine a variance based on the incident counts for the printing devices of the printing device model and the predicted incident count for the printing device model; and
   for each printing device:
      determine a difference between the incident count for the printing device and the predicted incident count for the printing device model associated with the printing device, and
      divide the difference for the printing device by the variance for the printing device model associated with the printing device to determine the residual value for the printing device.

10. The system of claim 6 wherein the one or more programming instructions that, when executed, cause the processor to identify one or more printing devices having a residual value exceeding a threshold value comprise one or more programming instructions that, when executed, cause the processor to:
    for each printing device model, determine a threshold value based on a normal distribution of the residual values for the printing device model; and
    identify one or more printing devices having a residual value that exceeds the threshold value for the printing device model associated with the corresponding printing device.

11. A method of identifying a printing device having an exceptional incident rate among a plurality of printing devices, the method comprising:
    for each of a plurality of printing devices, receiving, by a processor, a printing device model, a print volume, and an incident count associated with the printing device, wherein the incident count comprises a number of incidents occurring within a particular time frame, and wherein at least one of the incidents comprises one of a paper jam, a device malfunction, and a software error;
    determine, by the processor, a generalized linear regression model of the incident counts for each printing device model;
    for each printing device model, determining, by the processor, a predicted incident count using the generalized linear regression model;
    for each printing device, determining, by the processor, a residual value between the incident count for the printing device and the predicted incident count for the printing device model associated with the printing device; and
    identifying, by the processor, one or more printing devices having a residual value exceeding a threshold value.

12. The method of claim 11 wherein determining a generalized linear regression model comprises fitting a negative binomial regression model using the logarithm of the print volume and the printing device model as regressors for the negative binomial regression model.

13. The method of claim 11, further comprising reporting the one or more printing devices having a residual value exceeding a threshold value to a user.

14. The method of claim 11 wherein determining a residual value comprises:
for each printing device model, determining a variance based on the incident counts for the printing devices of the printing device model and the predicted incident count for the printing device model; and
for each printing device:
determining a difference between the incident count for the printing device and the predicted incident count for the printing device model associated with the printing device, and
dividing the difference for the printing device by the variance for the printing device model associated with the printing device to determine the residual value for the printing device.

15. The method of claim 11 wherein identifying one or more printing devices having a residual value exceeding a threshold value comprises:
for each printing device model, determining a threshold value based on a normal distribution of the residual values for the printing device model; and
identifying one or more printing devices having a residual value that exceeds the threshold value for the printing device model associated with the corresponding printing device.

16. A method of identifying a printing device having an exceptional incident rate among a plurality of printing devices, the method comprising:
for each of a plurality of printing devices, receiving, by a processor, a printing device model for the printing device, a print volume for the printing device, an incident count associated with the printing device, and an amount of time between the first and last incident for the printing device, wherein the incident count comprises a number of incidents occurring within the amount of time, and wherein at least one of the incidents comprises one of a paper jam, a device malfunction, and a software error;
determine, by the processor, a generalized linear regression model of the incident counts for each printing device model;
for each printing device model, determining, by the processor, a predicted incident count based on the generalized linear regression model;
for each printing device, determining, by the processor, a residual value between the incident count for the printing device and the predicted incident count for the printing device model associated with the printing device; and
identifying, by the processor, one or more printing devices having a residual value exceeding a threshold value.

17. The method of claim 16 wherein determining a generalized linear regression model comprises fitting a negative binomial regression model using the logarithm of the ratio between the print volume and the amount of time for the printing device and the printing device model as regressors for the negative binomial regression model.

18. The method of claim 16, further comprising:
reporting the one or more printing devices having a residual value exceeding a threshold value to a user.

19. The method of claim 16 wherein determining a residual value comprises:
for each printing device model, determining a variance based on the incident counts for the printing devices of the printing device model and the predicted incident count for the printing device model; and
for each printing device:
determining a difference between the incident count for the printing device and the predicted incident count for the printing device model associated with the printing device, and
dividing the difference for the printing device by the variance for the printing device model associated with the printing device to determine the residual value for the printing device.

20. The method of claim 16 wherein identifying one or more printing devices having a residual value exceeding a threshold value comprises:
for each printing device model, determining a threshold value based on a normal distribution of the residual values for the printing device model; and
identifying one or more printing devices having a residual value that exceeds the threshold value for the printing device model associated with the corresponding printing device.

* * * * *